March 16, 1971     S. S. SARRA     3,570,108
METHOD OF PROVIDING AND INSTALLING A GROUP
OF INSTRUMENTS IN A PANEL
Filed April 23, 1969     2 Sheets-Sheet 1
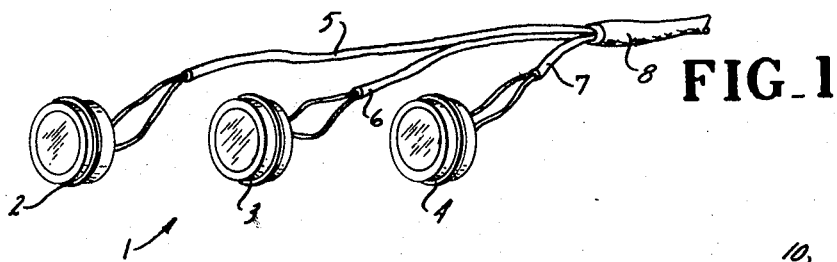
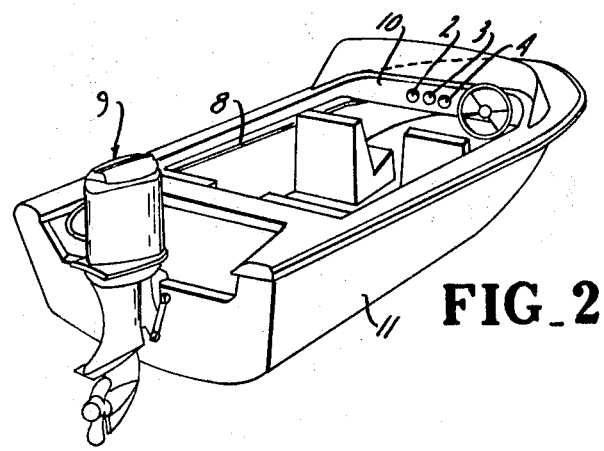
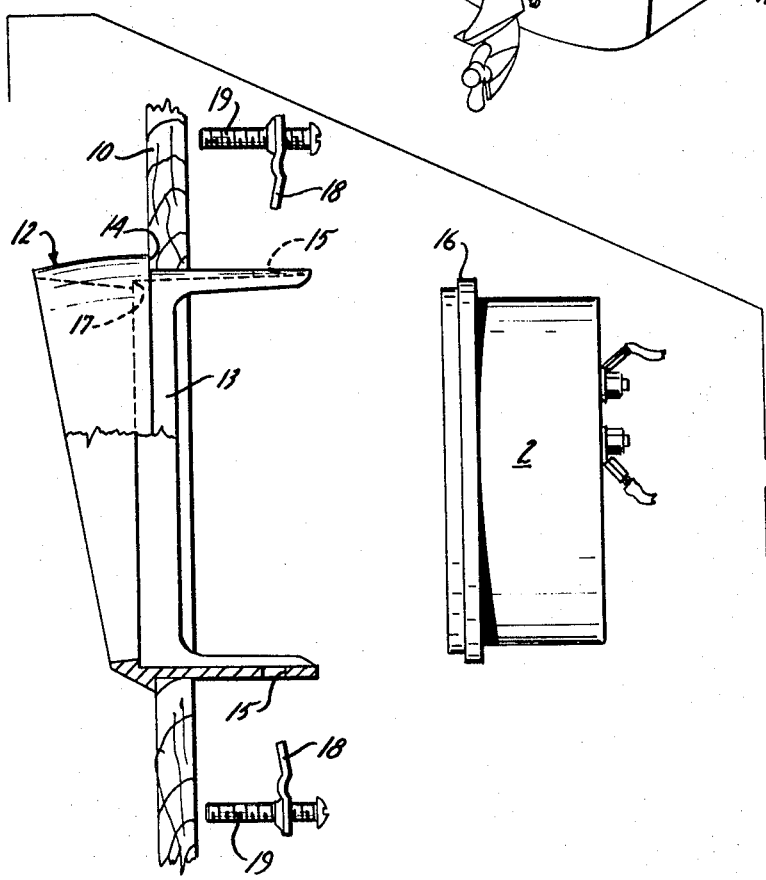
INVENTOR.
SALVATORE S. SARRA
BY
Attorneys March 16, 1971 — S. S. SARRA — 3,570,108
METHOD OF PROVIDING AND INSTALLING A GROUP OF INSTRUMENTS IN A PANEL
Filed April 23, 1969
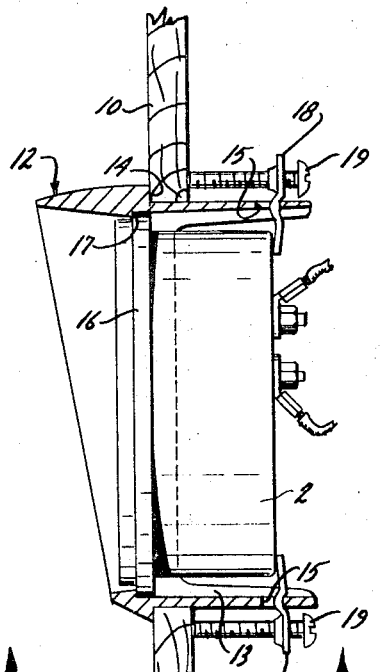
FIG.4
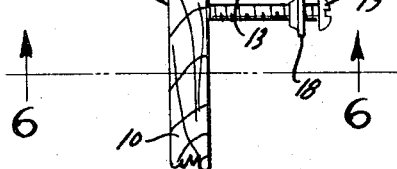
FIG.5
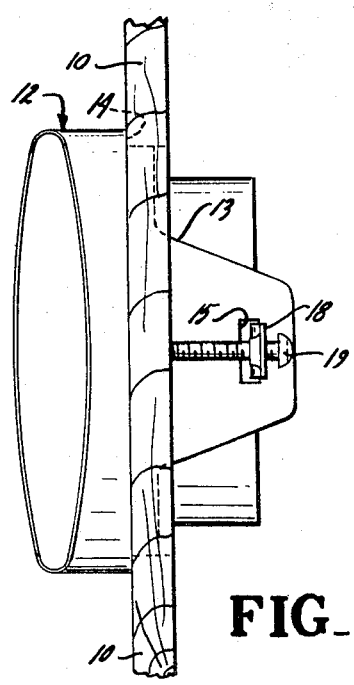
FIG.6
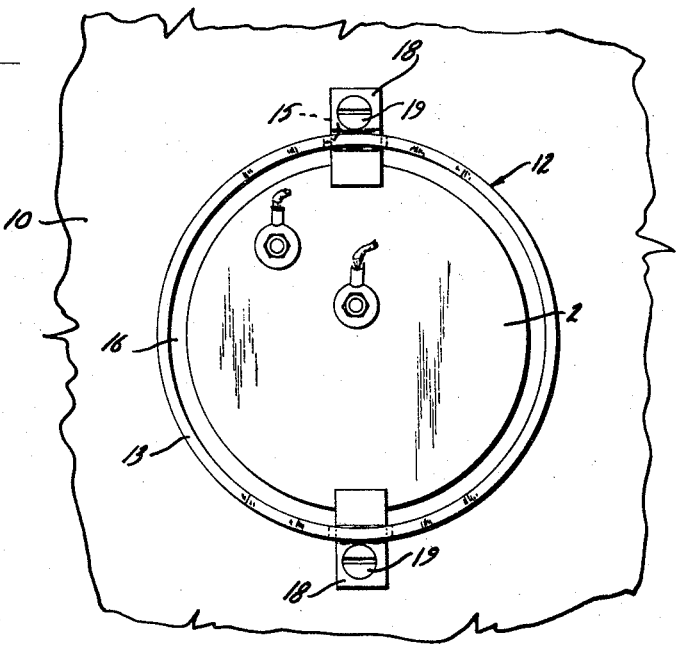
INVENTOR.
SALVATORE S SARRA
BY
Attorneys United States Patent Office 3,570,108
Patented Mar. 16, 1971

3,570,108
METHOD OF PROVIDING AND INSTALLING A GROUP OF INSTRUMENTS IN A PANEL
Salvatore S. Sarra, Fond du Lac, Wis., assignor to Brunswick Corporation, Chicago, Ill.
Filed Apr. 23, 1969, Ser. No. 818,732
Int. Cl. B23p 21/00
U.S. Cl. 29—469                                       1 Claim

ABSTRACT OF THE DISCLOSURE

A plurality of electrical instruments are prewired in a single harness for shipment, after which they are individually mounted in corresponding individual openings in a panel or dash by inserting the same from the rear and clamping the same to a front bezel peripheral of the openings.

This invention relates to a prewired instrument assembly for boats and the like.

Heretofore it has been customary to ship instruments packaged separately and to install the same in individual openings in the dash of a boat from the front, after which the instruments are wired from the rear to connect the same to a power source and to operative parts in other locations on the boat.

With the former assemblies, it has been impossible to prewire the instruments and the individual wiring by servicemen and others has kept costs high and requires a training program that has been difficult to provide.

The present invention provides a system and assembly which takes advantage of prewiring of the instruments in an electrical harness on the production line of the factory, thus greatly reducing costs and training problems.

This novel assembly is made possible by employing an instrument mounting of a type whereby each instrument is inserted into its corresponding individual opening from the rear of the panel or dash. Mountings of this type generally employ a bezel applied to the opening from the front and against which the instrument is clamped by suitable means applied from the rear of the panel.

By utilizing a mounting of this general type in which the instrument is inserted into its opening from the rear, all of the instruments may be prewired in a single electrical harness and all can be assembled into the panel from the rear so that the harness is properly installed as required.

The accompanying drawings illustrate embodiments presently contemplated as the best mode of carrying out the invention.

In the drawings:

FIG. 1 shows a group of different instruments that has been prewired in a single electrical harness at the factory and which can be packaged as a preassembly for shipment to dealers and sale to customers;

FIG. 2 shows a panel or dash on a boat and having individual openings for receiving the corresponding instruments and with the instruments mounted therein;

FIG. 3 is a detail section of the panel taken centrally of an opening and showing the initial positioning of the bezel therein and the instrument about to be inserted;

FIG. 4 is a view similar to FIG. 3 after the instrument has been inserted and clamped in place;

FIG. 5 is a rear view of a portion of the panel and of an instrument clamped in place therein; and FIG. 6 is a view of the clamp construction taken on line 6—6 of FIG. 4.

The group instrument assembly 1 illustrated in FIG. 1 comprises a plurality of different instruments 2, 3 and 4, each of which has been prewired into a single electrical harness by corresponding leads 5, 6 and 7 to a single cable 8 going to the engine 9 or other operative equipment of the boat.

The group instrument assembly 1 is adapted to be produced in the factory of an equipment manufacturer and to be packaged for shipment and subsequent installation by the boat manufacturer or dealer.

Installation of the assembly 1 into a panel or dash 10 of a boat 11 is a simple matter and does not require skilled help.

Each instrument 2, 3 and 4 is provided with a separate bezel 12 adapted to be inserted from the front into the corresponding opening in the panel or dash 10.

The bezel 12 comprises a generally tubular body 13 adapted to fit into the opening in the panel 10 and having an outward shoulder 14 engageable with the front of the panel to limit the rearward movement of the body through the opening when inserting the same and to position the bezel relative to the dash.

The body 13, or projections thereon, extend through and beyond the panel to the rear where a plurality of slots 15 are provided therethrough and spaced peripherally of the body, there being two diametrically opposed slots 15 shown through the rearward skirt portion of body 13, as shown in FIG. 3 and in greater detail in FIGS. 4, 5 and 6.

The instrument 2, illustrated in FIGS. 3 to 6, has a front rim 16 which engages an inward flange 17 in the bezel 12 generally flush with the front of the panel 10, and generally limiting the insertion of the instrument and positioning the latter relative to the dash.

The instrument is then clamped in position by clips 18 inserted through the corresponding slots 15 and having their inner ends engaging the back of the instrument and their outer ends biased rearwardly by adjusting screws 19 threaded therethrough and engaging the back of the panel 10.

The rear mounting of the instruments makes it possible to prewire them into a single electrical harness before installing the instruments in the panel or dash.

I claim:

1. The method of providing and installing a group of instruments in a panel, comprising preassembling the instruments in a harness, providing a panel with individual openings for receiving said instruments, mounting a bezel on the front of the panel and encircling each instrument opening therein with a portion extending rearwardly through the opening and with an outward shoulder on the bezel engaging the front edge portion of the panel encircling the corresponding opening, assembling each instrument in its respective opening from the rear of the panel and engaging an inward shoulder on the bezel positioning the instrument, inserting one or more clips through corresponding openings in the rearwardly extending portion of each said bezel with the inner end of the clip adapted to underlie a portion of the corresponding instrument to keep it in position against said inward bezel shoulder, and threading a stud through the outer end of said clip and into pressure contact with the back of the panel to bias the outer end of the clip outwardly and thereby clamp the instrument and bezel in place in the panel.

(References on following page)

References Cited

UNITED STATES PATENTS

| | | | |
|---|---|---|---|
| 1,273,986 | 7/1918 | Azadian | 73—431 |
| 2,264,485 | 12/1941 | Smith | 248—27 |
| 2,562,260 | 7/1951 | Caldwell | 248—27 |
| 2,805,471 | 9/1957 | Lowden | 29—464 |
| 3,231,225 | 1/1966 | Bokke | 248—27 |

FOREIGN PATENTS

| | | | |
|---|---|---|---|
| 570,247 | 6/1945 | Great Britain | 248—27 |

CHARLIE T. MOON, Primary Examiner

U.S. Cl. X.R.

29—526; 73—431; 248—27